United States Patent
Suzuki et al.

(10) Patent No.: US 7,387,481 B2
(45) Date of Patent: Jun. 17, 2008

(54) CARGO BOX OUTER HOOK MOUNTING STRUCTURE

(75) Inventors: Hidekazu Suzuki, Tokyo (JP); Yoshihisa Kojima, Kawasaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 46 days.

(21) Appl. No.: 11/153,605

(22) Filed: Jun. 16, 2005

(65) Prior Publication Data

US 2005/0280271 A1    Dec. 22, 2005

(30) Foreign Application Priority Data

Jun. 17, 2004   (JP) .............................. 2004-179168

(51) Int. Cl.
*B60P 7/08*    (2006.01)

(52) U.S. Cl. ........................ 410/115; 410/106; 410/108

(58) Field of Classification Search ................ 410/102, 410/106, 108, 110, 115–116; 24/115 K, 24/265 CD; 248/499

See application file for complete search history.

(56) References Cited

U.S. PATENT DOCUMENTS

| | | |
|---|---|---|
| 3,351,356 A | 11/1967 | Clark et al. |
| 5,364,211 A | 11/1994 | Lund |
| 5,738,471 A | 4/1998 | Zentner et al. |
| 6,039,520 A | 3/2000 | Cheng |
| 6,416,265 B1 * | 7/2002 | Flores et al. ................ 410/106 |

\* cited by examiner

*Primary Examiner*—Stephen Gordon
(74) *Attorney, Agent, or Firm*—Birch, Stewart, Kolasch & Birch, LLP

(57) ABSTRACT

An outer hook mounting structure for a cargo box, comprising: a side panel formed by an outer panel and an inner panel extending in a longitudinal direction of a vehicle on a side of the cargo box; a reinforcement disposed between the outer panel and the inner panel and fixed to the inner panel; passage holes provided in correspondence with the outer panel, the reinforcement, and the inner panel; and an outer hook passing through the outer panel and having an end portion fixed to the reinforcement.

3 Claims, 6 Drawing Sheets

CARGO BOX OUTER HOOK MOUNTING STRUCTURE

BACKGROUND OF THE INVENTION

1. Field of the Invention

This invention relates to a mounting structure for an outer hook to be provided on a cargo box of a vehicle.

2. Description of the Related Art

A cargo transporting vehicle, such as a truck, is equipped with a cargo box, and cargo loaded on the cargo box is fixed using a rope or the like. Normally, the rope is passed round outer hooks provided at predetermined intervals on a side edge portion of a cargo box floor or the exterior of side panels and a rear gate panel of the cargo box, whereby the cargo is set in place so as not to move on the cargo box. The outer hooks are made of a metallic material or the like, rod-shaped, mounted to protrude downwardly, and fixed by bolts or the like from the outside.

FIGS. 5 and 6 show a conventional outer hook mounting structure for a cargo box. As shown in FIGS. 5 and 6, a side panel 101 of the cargo box has an outer panel 102 and an inner panel 103. A hook bar 104 and outer hooks 105 are mounted on the outer panel 102 by clamping bolts 106. A reinforcement 108 is interposed between the outer panel 102 and the inner panel 103, and is supported on the inner panel 103 by having both end portions joined to the inner panel 103. The clamping bolt 106 is inserted through the outer panel 102 and the reinforcement 108, and is fixed by a nut 107 from inside the reinforcement 108.

The outer hook mounting structure, which has the outer hooks fixed by the bolts from outside the panel, is disclosed, for example, in Japanese Patent Application Laid-Open No. Hei 5-278515.

With the above-described outer hook mounting structure for the cargo box, however, the outer hooks are directly mounted on the outer panel. This has posed the problem that the structure of the reinforcing member (reinforcement) is upsized in order to prevent deformation of the outer panel during assembly and hook usage. Moreover, the structure requires bolting from the outside, causing the problems of a poor appearance and difficulty with rust prevention.

The present invention has been accomplished as a solution to the above problems. It is an object of the present invention to provide a cargo box outer hook mounting structure having a good appearance and satisfactory in rust prevention.

SUMMARY OF THE INVENTION

An aspect of the present invention is an outer hook mounting structure for a cargo box, comprising:

a side panel formed by an outer panel and an inner panel extending in a longitudinal direction of a vehicle on a side of the cargo box;

a reinforcement disposed between the outer panel and the inner panel and fixed to the inner panel;

passage holes provided in correspondence with the outer panel, the reinforcement, and the inner panel; and an outer hook passing through the outer panel and having an end portion fixed to the reinforcement.

Another aspect of the present invention is a cargo box-equipped vehicle equipped with a cargo box, comprising:

an outer panel and an inner panel extending in a longitudinal direction of the vehicle on a side of the cargo box, and each having at least one passage hole;

a reinforcement disposed between the outer panel and the inner panel, having a passage hole in a portion corresponding to the passage holes, and fixed to the inner panel; and an outer hook passing through the outer panel and having an end portion fixed to the reinforcement.

Still another aspect of the present invention is a cargo box outer hook mounting method for mounting an outer hook to a cargo box of a vehicle, the vehicle having an outer panel and an inner panel which extend in a longitudinal direction of the vehicle on a side of the cargo box, and each of which has at least one passage hole, and a reinforcement disposed between the outer panel and the inner panel, having a passage hole in a portion corresponding to the passage holes, and fixed to the inner panel, and the method comprising the steps of:

fitting a grommet into the passage hole provided in the outer panel;

inserting an end portion of the outer hook through the passage hole of the outer panel via the grommet; and fixing the end portion of the outer hook to the reinforcement.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

An embodiment of a cargo box outer hook mounting structure according to the present invention will now be described in detail with reference to the accompanying drawings.

Figure 1:
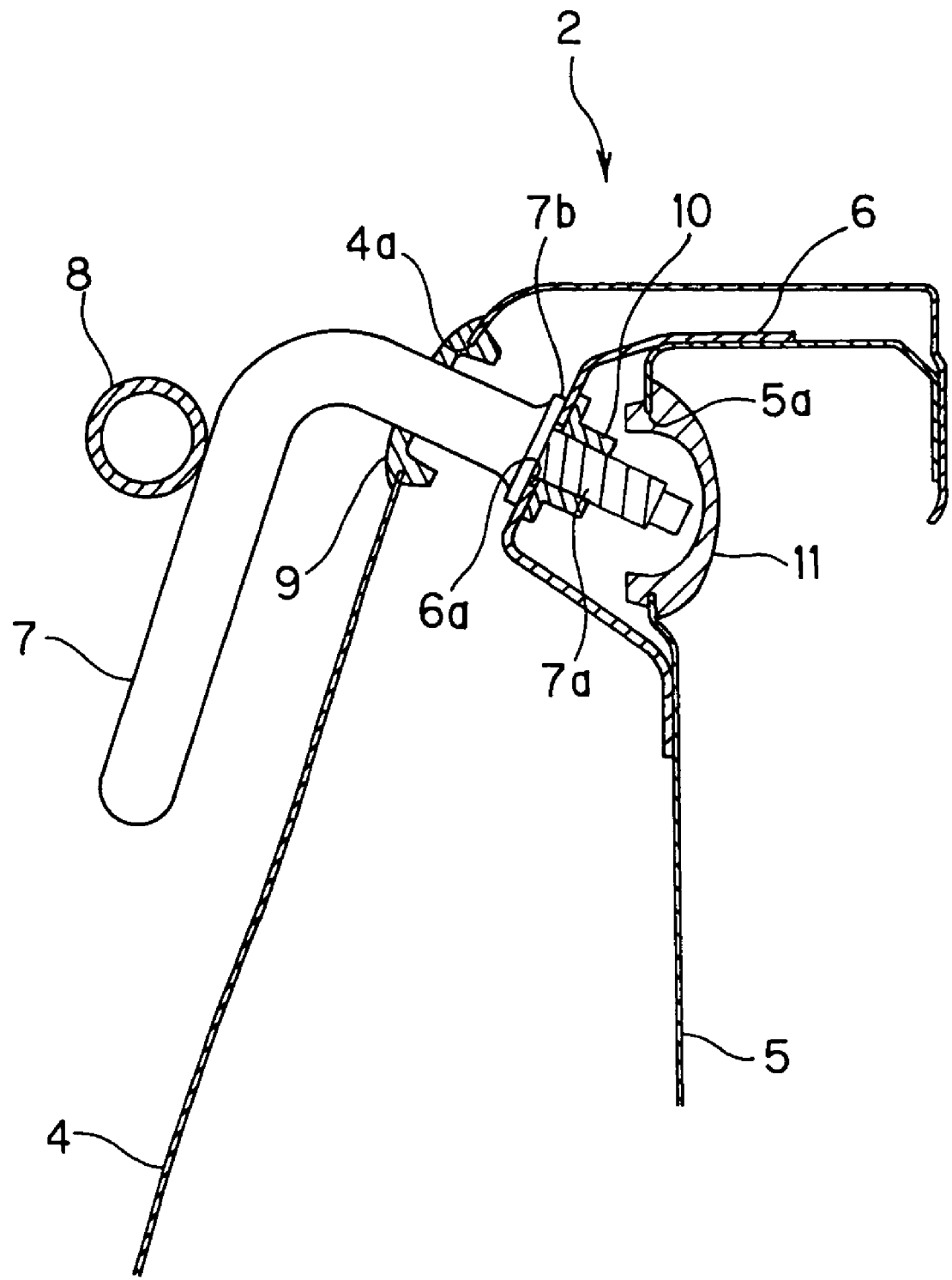
FIG. 1 is a sectional view showing an outer hook mounting structure according to an embodiment of the present invention.
Figure 2:
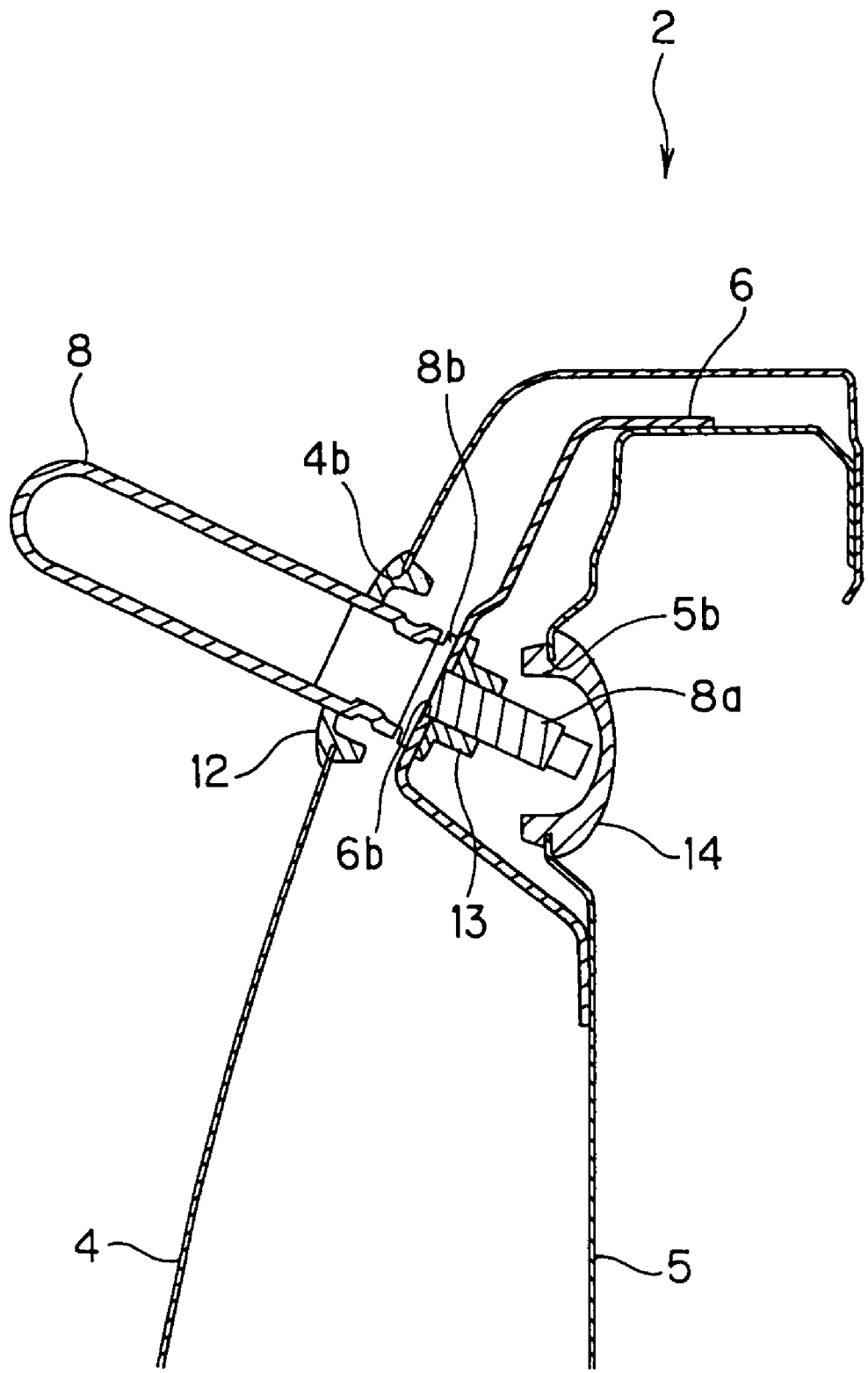
FIG. 2 is a sectional view showing a hook bar mounting structure in the embodiment of the present invention.
Figure 3:
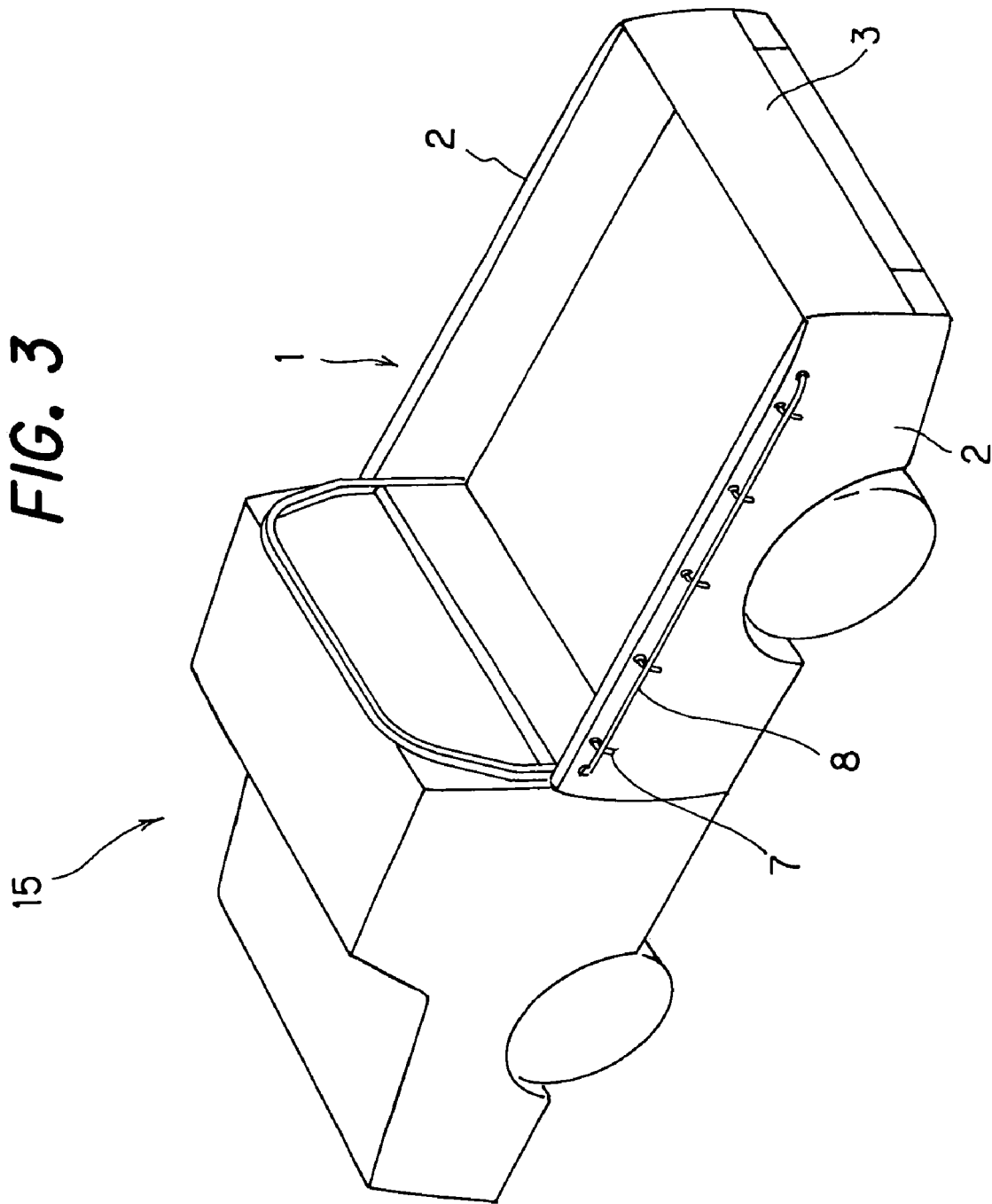
FIG. 3 is a schematic view showing a vehicle furnished with a cargo box in the embodiment of the present invention.
Figure 4:
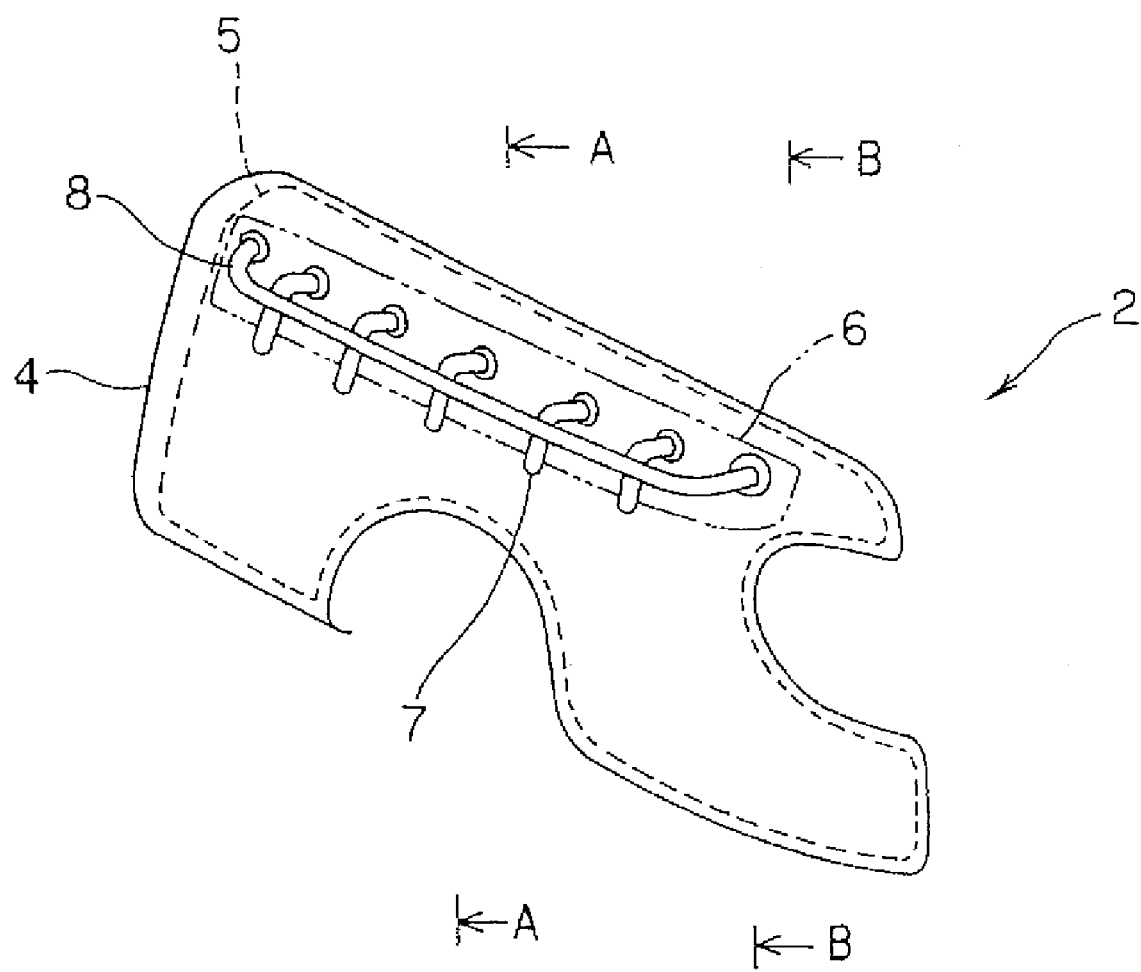
FIG. 4 is a schematic view of a side panel in the embodiment of the present invention.
Figure 5:
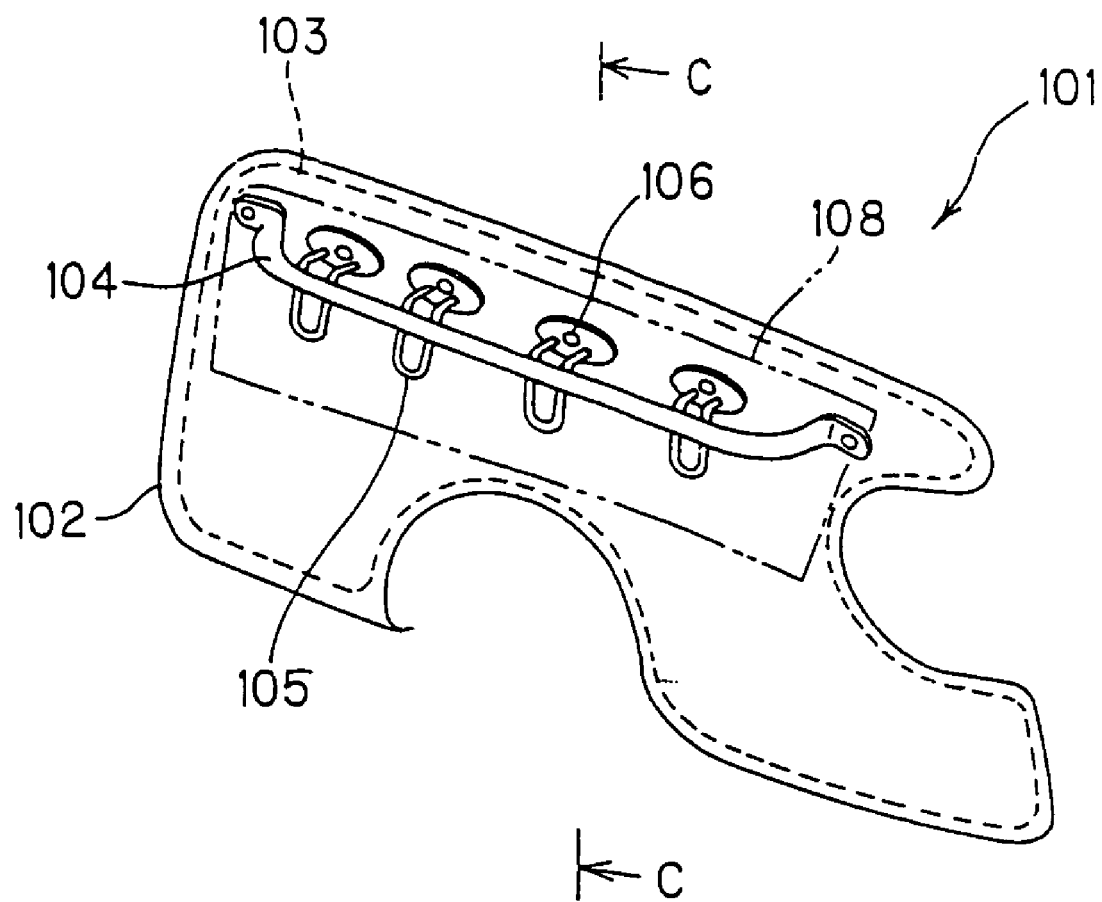
FIG. 5 is a schematic view of a side panel in a conventional example.
Figure 6:
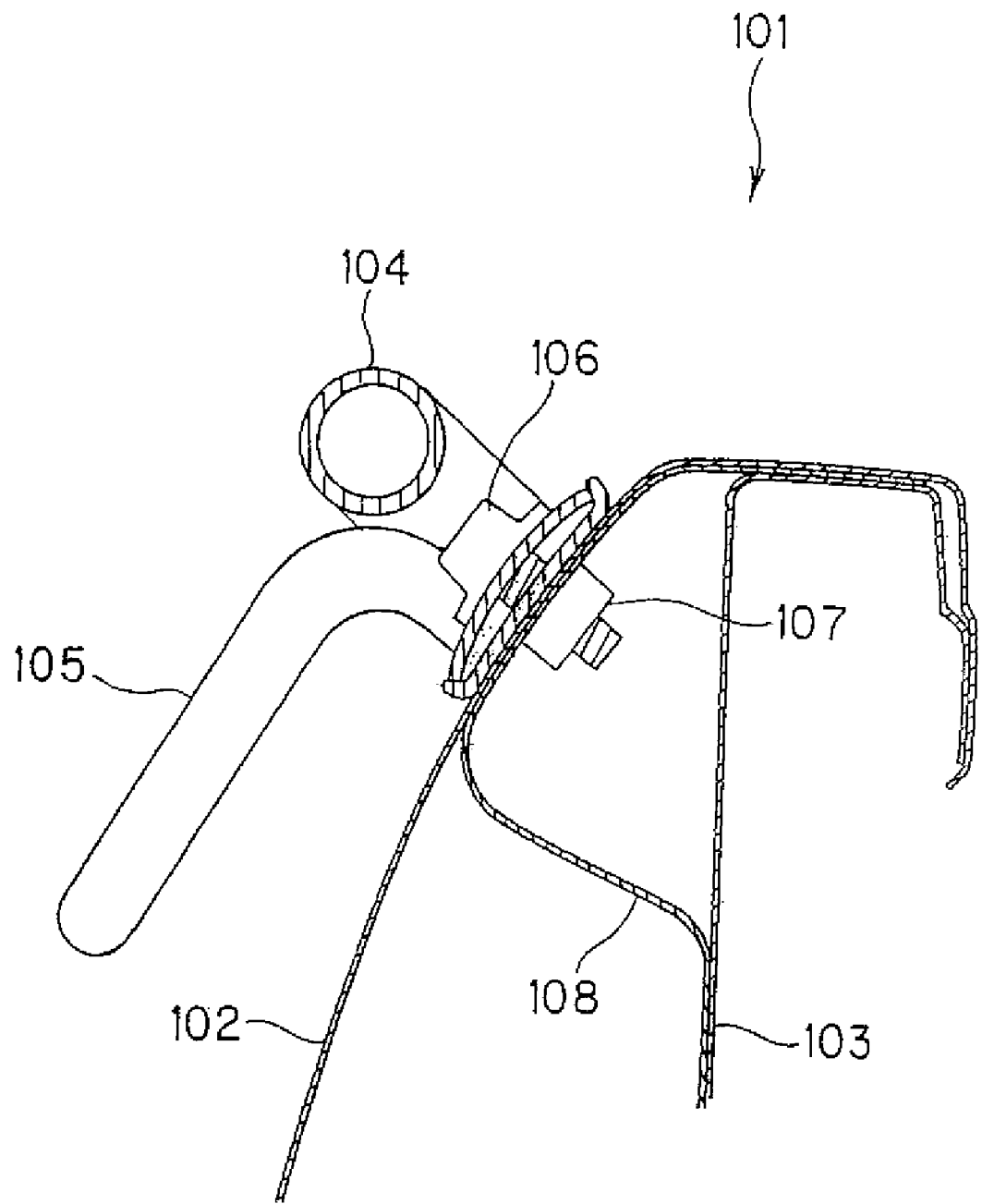
FIG. 6 is a sectional view taken on line C-C of FIG. 5.

FIG. 1 is a sectional view taken on line A-A of FIG. 4, showing an outer hook mounting structure according to an embodiment of the present invention. FIG. 2 is a sectional view taken on line B-B of FIG. 4, showing a hook bar mounting structure in the embodiment of the present invention. FIG. 3 is a schematic view showing a vehicle furnished with a cargo box in the embodiment of the present invention. FIG. 4 is a schematic view of a side panel in the embodiment of the present invention.

As shown in FIG. 3, a vehicle 15, which is a cargo transporting vehicle, such as a truck, is equipped with a cargo box 1. The cargo box 1 has a pair of side panels 2 and a rear gate panel 3.

As shown in FIG. 4, the side panel 2 has an outer panel 4 and an inner panel 5. A reinforcement 6, which extends in the longitudinal direction of the vehicle and has both end portions joined to the inner panel 5 by welding or the like, is interposed between the outer panel 4 and the inner panel 5. Outer hooks 7 and a hook bar 8 are mounted on the exterior of the outer panel 4. The outer hooks 7 are arranged at predetermined intervals in the longitudinal direction of the vehicle, while the hook bar 8 extends in the longitudinal direction of the vehicle, and is supported on the outer panel 4 at front and rear positions in the longitudinal direction of the vehicle.

A mounting structure for each of the outer hook 7 and the hook bar 8 will be described with reference to FIGS. 1 and 2.

As shown in FIG. 1, an end portion of the outer hook 7 is bent toward a lower part of the vehicle, and can be wound with a rope or the like (not shown). The other end portion of the outer hook 7 has a bolt portion 7a formed therein, and is inserted through passage holes 4a, 5a and 6a bored in the outer panel 4, the inner panel 5 and the reinforcement 6. A grommet 9 is fitted into the passage hole 4a.

A flange portion 7b of a larger diameter than the diameter of the passage hole 6a is formed on one end side of the bolt portion 7a of the outer hook 7. The flange portion 7b is disposed outwardly of the reinforcement 6, whereby the amount of insertion of the outer hook 7 into the side of the inner panel 5 is determined. The outer hook 7 so positioned by the flange portion 7b has the bolt portion 7a clamped to a clamping nut 10 inwardly of the reinforcement 6. The clamping nut 10 is inserted from the passage hole 5a, and can clamp the bolt portion 7a by means of a tool such as a wrench. By this measure, the outer hook 7 can be fixed only to the reinforcement 6. After clamping by the clamping nut 10, a plug 11 may be fitted into the passage hole 5a so as to cover the front end of the bolt portion 7a.

As shown in FIG. 2, an end portion of the hook bar 8 has a bolt portion 8a formed therein, and is inserted through passage holes 4b, 5b and 6b bored in the outer panel 4, the inner panel 5 and the reinforcement 6. A grommet 12 is fitted into the passage hole 4b.

A flange portion 8b of a larger diameter than the diameter of the passage hole 6b is formed on one end side of the bolt portion 8a of the hook bar 8. The flange portion 8b is disposed outwardly of the reinforcement 6, whereby the amount of insertion of the hook bar 8 into the side of the inner panel 5 is determined. The hook bar 8 so positioned by the flange portion 8b has the bolt portion 8a clamped to a clamping nut 13 inwardly of the reinforcement 6. The clamping nut 13 is inserted from the passage hole 5b, and can clamp the bolt portion 8a by means of a tool such as a wrench. By this measure, the hook bar 8 can be fixed only to the reinforcement 6. After clamping by the clamping nut 13, a plug 14 may be fitted into the passage hole 5b so as to cover the front end of the bolt portion 8a.

Because of the above-described features, instead of performing mounting using bolts as in the earlier technologies, mounting is carried out, with the bolt portions 7a and 8a being formed in the outer hook 7 and the hook bar 8. Thus, a good appearance can be provided. Moreover, the bolt portions 7a and 8a are disposed in the side panel 2, so that the bolt portions are rust-resistant and rust prevention can be ensured satisfactorily. That is, the bolt portions 7a and 8a are formed in the outer hook 7 and the hook bar 8 themselves, the outer hook 7 and the hook bar 8 are inserted from outside the outer panel 4, and the clamping nuts 10 and 13 are clamped from inside the inner panel 5. By so doing, the structure can be simplified, and an improved appearance can be obtained.

Furthermore, the grommets 9 and 12 are fitted into the passage holes 4a and 4b of the outer panel 4, and the clamping nuts 10 and 13 are inserted through the passage holes 5a and 5b of the inner panel 5 for clamping. Thus, scarring of the outer panel 4 during assembly can be prevented.

Besides, the outer hooks are mounted only on the reinforcement 6, instead of being directly mounted on the outer panel as in the conventional practice. Thus, an input load on the outer panel 4 can be decreased during use of the hooks, and the reinforcement 6 can be downsized. Thus, cost reduction can be achieved. In addition, since the reinforcement 6 can be downsized, there is no need any more to mount the outer panel 4 and the reinforcement 6 together. Thus, warpage of the outer panel 4 during use of the hooks can be decreased.

The reinforcement 6 has opposite end portions supported by the inner panel 5, and has a closed sectional-shape structure, so that the rigidity of the reinforcement 6 is enhanced. Thus, even if an input load on the reinforcement 6 is added during assembly, the deformation of the inner panel 5 and the reinforcement 6 can be prevented.

According to the cargo box outer hook mounting structure of the present invention, therefore, a good appearance can be obtained, and rusting can be satisfactorily prevented, because this mounting structure comprises the side panel 2 formed by the outer panel 4 and the inner panel 5 extending in the longitudinal direction of the vehicle on the side of the cargo box 1; the reinforcement 6 disposed between the outer panel 4 and the inner panel 5 and having opposite end portions fixed to the inner panel 5; the passage holes 4a, 5a and 6a provided in correspondence with the outer panel 4, the inner panel 5 and the reinforcement 6; and the outer hook 7 passing through the outer panel 4 and having the end portion fixed to the reinforcement 6.

Moreover, scarring of the outer panel 4 can be prevented during assembly of the outer hooks 7 by providing the passage holes 4a, 5a and 6a in the outer panel 4, the inner panel 5, and the reinforcement 6; forming the bolt portion 7a in the end portion of the outer hook 7; passing the outer hook 7 through the passage hole 4a of the outer panel 4; passing the bolt portion 7a through the passage hole 6a of the reinforcement 6; and clamping the clamping nut 10 to the bolt portion 7a from the passage hole 5a of the inner panel 5, thereby fixing the bolt portion 7a to the reinforcement 6. Furthermore, since the outer hooks 7 are not directly mounted on the outer panel 4, input load on the outer panel 4 is minimal during use of the hooks, and the reinforcement 6 can be downsized. Thus, cost reduction can be achieved. In addition, since it is not necessary any more to mount the outer panel 4 and the reinforcement 6 together. Thus, warpage of the outer panel 4 during use of the hooks can be decreased.

Besides, the reinforcement 6 is supported by the inner panel 5 so as to have a closed sectional-shape structure. Thus, the rigidity of the reinforcement 6 is enhanced, and the deformation of the inner panel 5 and the reinforcement 6 can be prevented during clamping of the outer hook 7.

Additionally, the grommet 9 is fitted into the passage hole 4a provided in the outer panel 4, and the outer hook 7 is inserted via the grommet 9. Thus, scarring of the outer panel 4 can be prevented.

It is also possible to apply the cargo box outer hook mounting structure according to the present invention to the rear gate panel 3.

As described above, the present invention can be applied to the outer hook mounting structure using no bolt.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An outer hook mounting structure for a cargo box, comprising:
    a side panel formed by an outer panel and an inner panel extending in a longitudinal direction of a vehicle on a side of said cargo box;
    a reinforcement disposed between said outer panel and said inner panel and fixed to said inner panel;
    passage holes provided at sites corresponding, respectfully, to said outer panel, said reinforcement, and said inner panel;
    an outer hook passing though said outer panel and having an end portion fixed only to said reinforcement;
    said passage holes are provided in said outer panel, said reinforcement, and said inner panel;
    a bolt portion is formed in said end portion of said outer hook,
    said outer hook is passed through said passage hole of said outer panel,
    said bolt portion is passed through said passage hole of said reinforcement, and
    a clamping nut is clamped to said bolt portion from said passage hole of said inner panel,
    whereby said bolt portion is fixed to said reinforcement.

2. The outer hook mounting structure for a cargo box according to claim 1, wherein
    said reinforcement is supported by said inner panel so as to have a closed cross section.

3. The outer hook mounting structure for a cargo box according to claim 1, wherein
    a grommet is fitted into a passage hole provided in said outer panel, and said outer hook is inserted via said grommet.

* * * * *